US012587663B2

(12) United States Patent　　　　　(10) Patent No.:　US 12,587,663 B2
Ryder et al.　　　　　　　　　　　　　(45) Date of Patent:　Mar. 24, 2026

(54) SLIDING-WINDOW RATE-DISTORTION OPTIMIZATION IN NEURAL NETWORK-BASED VIDEO CODING

(71) Applicant: QUALCOMM Incorporated, San Diego, CA (US)

(72) Inventors: Thomas Alexander Ryder, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/188,268

(22) Filed: Mar. 22, 2023

(65) Prior Publication Data

US 2024/0323416 A1　　Sep. 26, 2024

(51) Int. Cl.
| | |
|---|---|
| *H04N 19/124* | (2014.01) |
| *H04N 19/159* | (2014.01) |
| *H04N 19/172* | (2014.01) |
| *H04N 19/42* | (2014.01) |
| *H04N 19/503* | (2014.01) |

(52) U.S. Cl.
CPC ........... *H04N 19/42* (2014.11); *H04N 19/124* (2014.11); *H04N 19/159* (2014.11); *H04N 19/172* (2014.11); *H04N 19/503* (2014.11)

(58) Field of Classification Search
CPC .. H04N 19/124; H04N 19/147; H04N 19/159; H04N 19/172; H04N 19/42; H04N 19/503

USPC ......................................................... 375/240
See application file for complete search history.

(56) References Cited

U.S. PATENT DOCUMENTS

| | | | | |
|---|---|---|---|---|
| 2016/0182910 A1* | 6/2016 | Barroux | ............... | H04N 19/112 |
| | | | | 375/240.26 |
| 2018/0205908 A1* | 7/2018 | Zhang | ................... | H04N 7/0137 |
| 2022/0014758 A1* | 1/2022 | Zhao | ..................... | H04N 19/197 |
| 2022/0239944 A1* | 7/2022 | Zhang | ...................... | G06N 3/08 |
| 2022/0385907 A1* | 12/2022 | Zhang | ..................... | H04N 19/91 |
| 2024/0297963 A1* | 9/2024 | Mccaffrey | ............... | G06T 7/262 |

OTHER PUBLICATIONS

International Search Report and Written Opinion—PCT/US2024/018894—ISA/EPO—Jun. 4, 2024 18 Pages.
(Continued)

*Primary Examiner* — William C Vaughn, Jr.
*Assistant Examiner* — Astewaye Gettu Zewede
(74) *Attorney, Agent, or Firm* — Shumaker & Sieffert, P.A.

(57) ABSTRACT

A device for encoding video data can be configured to encode a set of input frames of the video data with an image analysis neural network to generate a corresponding set of output frames, wherein the set of output frames includes a first output frame and additional output frames, wherein the first output frame temporally precedes the additional output frames; determine a modification to the first output frame that results in an optimized amount of distortion between the set of input frames and decoded versions of the corresponding set of output frames; update the first output frame based on the determined modification; and output a bitstream that includes the updated first output frame.

25 Claims, 5 Drawing Sheets

(56) References Cited

OTHER PUBLICATIONS

Jin X., et al., "Semantical Video Coding: Instill Static-dynamic Clues into Structured Bitstream for AI tasks," Journal of Visual Communication and Image Representation, Academic Press, Inc, US, vol. 93, Mar. 23, 2023, pp. 1-12, XP087312489, The whole document.

Jung-Kyung L., et al., "Deep Video Prediction Network-Ased Inter-Frame Coding in HEVC," IEEE Access, IEEE, USA, vol. 8, May 8, 2020, pp. 95906-95917, XP011791138, The whole document.

Yu J., et al., "[FCVCM] E2E Approach : Extension of L-MSFC-v2 Intra (m65200) for Inter Frame Coding," 144. MPEG Meeting, Oct. 16, 2023-Oct. 20, 2023, Hannover, (Motion Picture Expert Group or ISO/IEC JTC1/SC29/ WG11), No. m65204. Oct. 11, 2023, 9 Pages, XP030312676, The whole document.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Xu T., et al., "Bit Allocation using Optimization", arXiv:2209. 09422v1 [cs.CV] Sep. 20, 2022, 19 Pages.

Xue T., et al., "Video Enhancement with Task-Oriented Flow", International Journal of Computer Vision, arXiv:1711.09078v3 [cs. CV] Nov. 10, 2019, pp. 1-20.

* cited by examiner

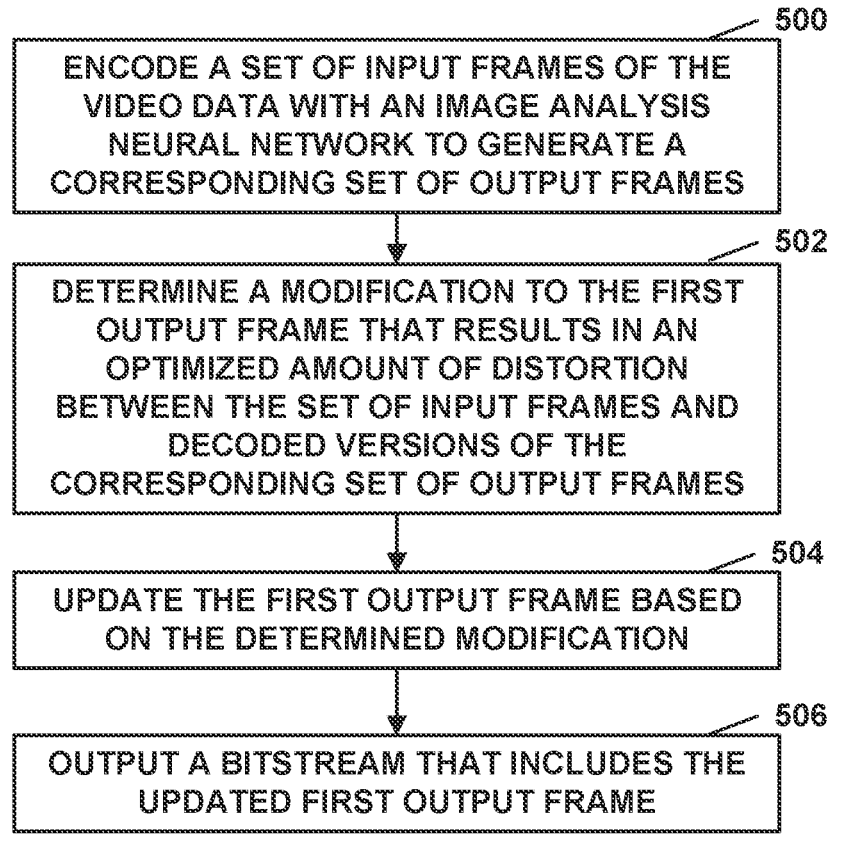

ENCODE A SET OF INPUT FRAMES OF THE VIDEO DATA WITH AN IMAGE ANALYSIS NEURAL NETWORK TO GENERATE A CORRESPONDING SET OF OUTPUT FRAMES
— 500

DETERMINE A MODIFICATION TO THE FIRST OUTPUT FRAME THAT RESULTS IN AN OPTIMIZED AMOUNT OF DISTORTION BETWEEN THE SET OF INPUT FRAMES AND DECODED VERSIONS OF THE CORRESPONDING SET OF OUTPUT FRAMES
— 502

UPDATE THE FIRST OUTPUT FRAME BASED ON THE DETERMINED MODIFICATION
— 504

OUTPUT A BITSTREAM THAT INCLUDES THE UPDATED FIRST OUTPUT FRAME
— 506

FIG. 5

SLIDING-WINDOW RATE-DISTORTION OPTIMIZATION IN NEURAL NETWORK-BASED VIDEO CODING

TECHNICAL FIELD

This disclosure relates to media encoding and decoding, including the encoding and decoding of images and video data.

BACKGROUND

Digital media capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

SUMMARY

An E2E-NVC can increase the quality of decoded video by inserting I-frames more frequently, but doing so, typically results in a rate-distortion tradeoff that is inferior to that of HEVC and VVC coders. Therefore, in order to reduce bit rate, E2E-NVCs will train on a smaller number of frames such as 3 to 7, with the hope that this limited training will produce desirable results across a much larger sequence of frames. Typically, however, training on a substantially smaller number of frames than what is included in the sequence of P-frames results in increasing distortion as the media decoder proceeds through the sequence of P-frames. This varying level of distortion can produce a user experience that is in many cases even worse than consistently high distortion.

This disclosure describes sliding-window rate-distortion optimization techniques that address the problems introduced above. As will be described in more detail below, this disclosure describes techniques for encoding a set of input frames with an image analysis neural network to generate a corresponding set of output frames. By using a sliding window to determine a modification to a first output frame that results in an optimized amount of distortion between the set of input frames and decoded versions of the corresponding set of output frames, the techniques of this disclosure may enable E2E-NVCs to use sequences of P-frames that are comparable in length to the sequences used by conventional video coders without distortion increasing as the E2E-NVC progresses through the sequence of P-frames.

According to one example, a method of encoding video data includes encoding a set of input frames of the video data with an image analysis neural network to generate a corresponding set of output frames, wherein the set of output frames includes a first output frame and additional output frames, wherein the first output frame temporally precedes the additional output frames; determining a modification to the first output frame that results in an optimized amount of distortion between the set of input frames and decoded versions of the corresponding set of output frames; updating the first output frame based on the determined modification; and outputting a bitstream that includes the updated first output frame.

According to another example, a device for encoding video data includes a memory configured to store video data; one or more processors implemented in circuitry and configured to: encode a set of input frames of the video data with an image analysis neural network to generate a corresponding set of output frames, wherein the set of output frames includes a first output frame and additional output frames, wherein the first output frame temporally precedes the additional output frames; determine a modification to the first output frame that results in an optimized amount of distortion between the set of input frames and decoded versions of the corresponding set of output frames; update the first output frame based on the determined modification; and output a bitstream that includes the updated first output frame.

According to another example, a computer-readable storage medium stores instructions that when executed by one or more processors cause the one or more processors to encode a set of input frames of the video data with an image analysis neural network to generate a corresponding set of output frames, wherein the set of output frames includes a first output frame and additional output frames, wherein the first output frame temporally precedes the additional output frames; determine a modification to the first output frame that results in an optimized amount of distortion between the set of input frames and decoded versions of the corresponding set of output frames; update the first output frame based on the determined modification; and output a bitstream that includes the updated first output frame.

According to another example, a device for encoding video data includes means for encoding a set of input frames of the video data with an image analysis neural network to generate a corresponding set of output frames, wherein the set of output frames includes a first output frame and additional output frames, wherein the first output frame temporally precedes the additional output frames; means for determining a modification to the first output frame that results in an optimized amount of distortion between the set of input frames and decoded versions of the corresponding set of output frames; means for updating the first output frame based on the determined modification; and means for outputting a bitstream that includes the updated first output frame.

The details of one or more examples are set forth in the accompanying drawings and the description below. Other features, objects, and advantages will be apparent from the description, drawings, and claims.

BRIEF DESCRIPTION OF DRAWINGS

FIG. 5 is a flowchart illustrating an example process for encoding a set of input frames in accordance with the techniques of this disclosure.

DETAILED DESCRIPTION

Figure 1:
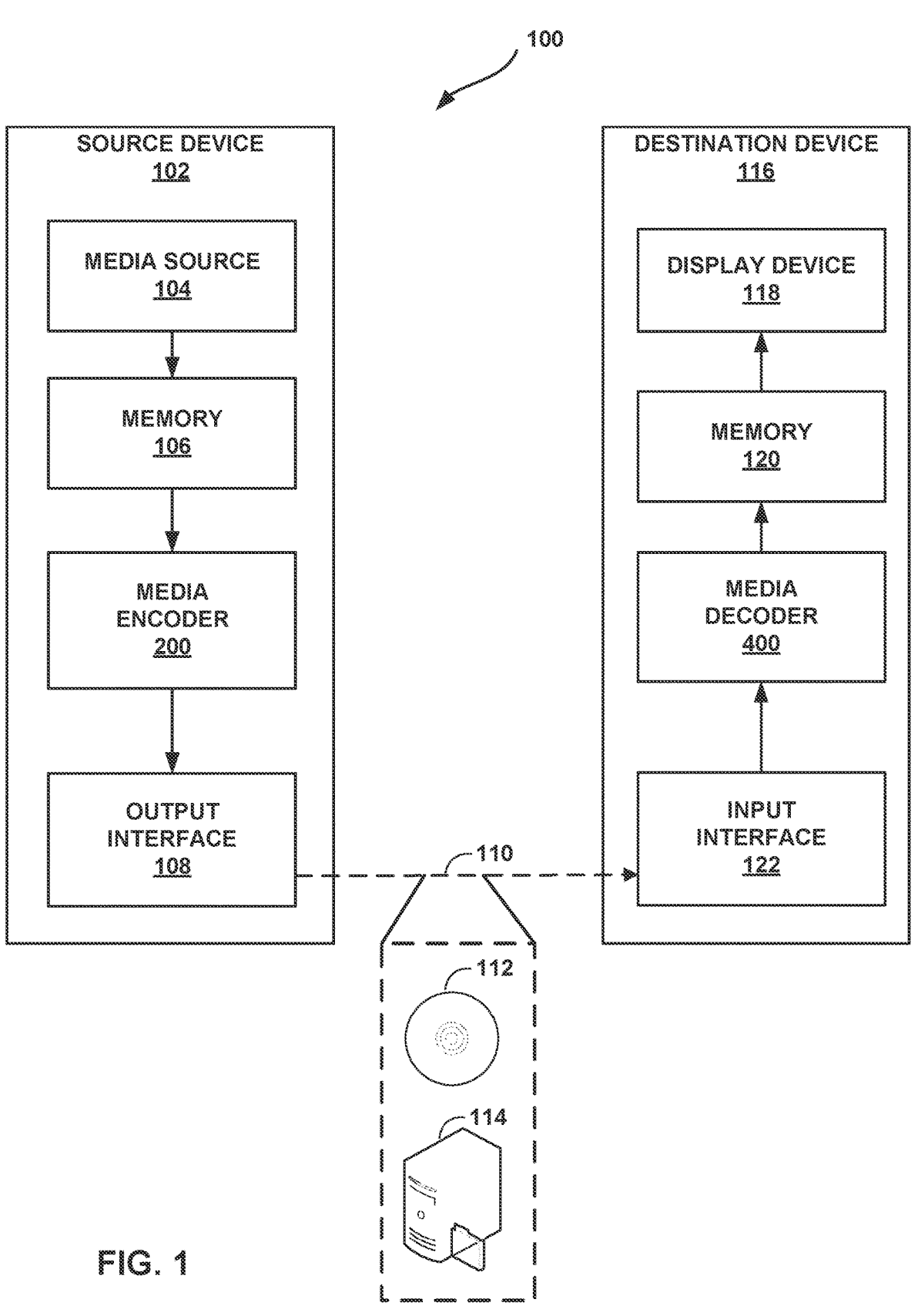
FIG. 1 is a block diagram illustrating an example media encoding and decoding system that may perform the techniques of this disclosure.

This disclosure describes techniques for coding, e.g., encoding and/or decoding, media data (e.g., images or videos) using neural-network-based media coding techniques. Both conventional video coding and neural-network-based video coding utilize a combination of intra-coding and inter-coding. When performing intra-coding, a media encoder encodes a portion of video data, such as a frame or portion thereof, using only data from the same frame of the portion being encoded. When performing inter-coding, a media encoder may encode the portion of video data using data from previously coded frames in addition to using data from the same frame of the portion being encoded. Thus, an intra-coded frame of video data, also referred to as an I-frame, generally refers to a frame where all data needed to decode the frame is included within the frame, whereas an inter-coded frame, also referred to as a predicted frame or P-frame, requires data from previously coded frames. Although the terms frame and picture, may have specific meanings in certain codecs or standards, this disclosure uses the terms interchangeably in a generic fashion to refer to any sort of intermediate or final output image.

In both conventional video coding and neural-network-based video coding, P-frames provide significantly better coding efficiency compared to I-frames. A certain number of I-frames may be necessary, however, to obtain a desired level of coding quality, as well as to support random access and other such features. A conventional video encoder, according to the HEVC or VVC standard for instance, may include an I frame as frequently as once every 30 frames, but in many coding scenarios may include an I-frame much less frequently, such as once every 120 frames or even as infrequently as once every 600 frames. End-to-end neural video coders (E2E-NVCs), however, typically do not perform well with such large sequences of P-frames. One reason E2E-NVCs do not perform well on such large sequences of P-frames is the time for training on large sequences of P-frames is incompatible with low-delay coding applications and is still generally not practical even for non-low-delay coding applications due to time, memory, and processing requirements.

An E2E-NVC can increase the quality of decoded video by inserting I-frames more frequently, but doing so, typically results in a rate-distortion tradeoff that is inferior to that of HEVC and VVC coders. Therefore, in order to reduce bit rate, E2E-NVCs will train on a smaller number of frames such as 3 to 7, with the hope that this limited training will produce desirable results across a much larger sequence of frames. Typically, however, training on a substantially smaller number of frames than what is included in the sequence of P-frames results in increasing distortion as the media decoder proceeds through the sequence of P-frames. This varying level of distortion can produce a user experience that is in many cases even worse than consistently high distortion.

This disclosure describes sliding-window rate-distortion optimization techniques that address the problems introduced above. As will be described in more detail below, this disclosure describes techniques for encoding a set of input frames with an image analysis neural network to generate a corresponding set of output frames. By using a sliding window to determine a modification to a first output frame that results in an optimized amount of distortion between the set of input frames and decoded versions of the corresponding set of output frames, the techniques of this disclosure may enable E2E-NVCs to use sequences of P-frames that are comparable in length to the sequences used by conventional video coders without distortion increasing as the E2E-NVC progresses through the sequence of P-frames.

FIG. 1 is a block diagram illustrating an example media encoding and decoding system 100 that may perform the techniques of this disclosure. In the context of this disclosure, media may include any digital file to be compressed, including video data and/or images. The example techniques of this disclosure are generally directed to coding (encoding and/or decoding) video data and/or image data. While examples of FIG. 1 will be described with reference to media encoding and decoding, the techniques of this application are equally applicable to the encoding and decoding of any type of data file using neural-based compression techniques.

As shown in FIG. 1, system 100 includes a source device 102 that provides encoded media data to be decoded and displayed by a destination device 116, in this example. In particular, source device 102 provides the media data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes media source 104, memory 106, media encoder 200, and output interface 108. Destination device 116 includes input interface 122, media decoder 400, memory 120, and display device 118. In accordance with this disclosure, media encoder 200 of source device 102 may be configured to apply the techniques for sliding-window rate distortion optimization described herein. Source device 102 represents an example of a media encoding device, while destination device 116 represents an example of a media decoding device. In other examples, a source device and a destination device may include other components or arrangements. For example, source device 102 may receive media data from an external media source, such as an external camera. Likewise, destination device 116 may interface with an external display device, rather than include an integrated display device.

System 100, as shown in FIG. 1, is merely one example. In general, any digital media encoding and/or decoding device may perform techniques for entropy coding a neural-based media compression system. Source device 102 and destination device 116 are merely examples of such coding devices in which source device 102 generates coded media data for transmission to destination device 116. This disclosure refers to a "coding" device as a device that performs coding (encoding and/or decoding) of data. Thus, media encoder 200 and media decoder 400 represent examples of coding devices, in particular, a media encoder and a media decoder, respectively. In some examples, source device 102 and destination device 116 may operate in a substantially symmetrical manner such that each of source device 102 and destination device 116 includes media encoding and decoding components. Hence, system 100 may support one-way or two-way media transmission between source device 102 and destination device 116, e.g., for video streaming, video playback, video broadcasting, or video telephony.

In general, media source 104 represents a source of media data (i.e., raw, unencoded media data) and provides a sequential series of pictures (also referred to as "frames") of the media data to media encoder 200, which encodes data for the pictures. Media source 104 of source device 102 may include a video capture device, such as a video camera, a video archive containing previously captured raw video, and/or a video feed interface to receive video from a video content provider. As a further alternative, media source 104 may generate computer graphics-based data as the source media, or a combination of live media, archived media, and computer-generated media. In each case, media encoder 200 encodes the captured, pre-captured, or computer-generated media data. Media encoder 200 may rearrange the pictures from the received order (sometimes referred to as "display order") into a coding order for coding. Media encoder 200 may generate a bitstream including encoded media data. Source device 102 may then output the encoded media data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw media data, e.g., raw media from media source 104 and raw, decoded media data from media decoder 400. Additionally or alternatively, memories 106, 120 may store software instructions executable by, e.g., media encoder 200 and media decoder 400, respectively. Although memory 106 and memory 120 are shown separately from media encoder 200 and media decoder 400 in this example, it should be understood that media encoder 200 and media decoder 400 may also include internal memories for functionally similar or equivalent purposes. Furthermore, memories 106, 120 may store encoded media data, e.g., output from media encoder 200 and input to media decoder 400. In some examples, portions of memories 106, 120 may be allocated as one or more buffers, e.g., to store raw, decoded, and/or encoded media data.

Computer-readable medium 110 may represent any type of medium or device capable of transporting the encoded media data from source device 102 to destination device 116. In one example, computer-readable medium 110 represents a communication medium to enable source device 102 to transmit encoded media data directly to destination device 116 in real-time, e.g., via a radio frequency network or computer-based network. Output interface 108 may modulate a transmission signal including the encoded media data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded media data.

In some examples, source device 102 may output encoded media data to file server 114 or another intermediate storage device that may store the encoded media data generated by source device 102. Destination device 116 may access stored media data from file server 114 via streaming or download.

File server 114 may be any type of server device capable of storing encoded media data and transmitting that encoded media data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (cMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded media data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded media data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded media data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded media data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to media encoder 200 and/or output interface 108, and destination device 116 may include an SoC device to perform the functionality attributed to media decoder 400 and/or input interface 122.

The techniques of this disclosure may be applied to media coding in support of any of a variety of multimedia applications, such as over-the-air television broadcasts, cable television transmissions, satellite television transmissions, Internet streaming media transmissions, such as dynamic adaptive streaming over HTTP (DASH), digital media that is encoded onto a data storage medium, decoding of digital media stored on a data storage medium, or other applications. The techniques of this disclosure may be of particular benefit for low-delay applications but are not limited only to low-delay applications.

Input interface 122 of destination device 116 receives an encoded media bitstream from computer-readable medium 110 (e.g., a communication medium, storage device 112, file server 114, or the like). The encoded media bitstream may include signaling information defined by media encoder 200, which is also used by media decoder 400. Display device 118 displays decoded pictures of the decoded media data to a user. Display device 118 may represent any of a variety of display devices such as a liquid crystal display (LCD), a plasma display, an organic light emitting diode (OLED) display, or another type of display device.

Although not shown in FIG. 1, in some examples, media encoder 200 and media decoder 400 may each be integrated with an audio encoder and/or audio decoder, and may include appropriate MUX-DEMUX units, or other hardware and/or software, to handle multiplexed streams including both audio and media in a common data stream.

Media encoder 200 and media decoder 400 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of media encoder 200 and media decoder 400 may be included in one or more encoders or decoders, either of which may be integrated as part of a combined encoder/decoder (CODEC) in a respective device. A device including media encoder 200 and/or media decoder 400 may comprise an integrated circuit, a microprocessor, and/or a wireless communication device, such as a cellular telephone.

Image and video (e.g., media) compression processes based on neural networks can be competitive to current standards and provide several additional advantages; however, as introduced above, current neural-network-based media coders do not handle longer sequences of P-frames well, which hurts overall performance.

Figure 2:
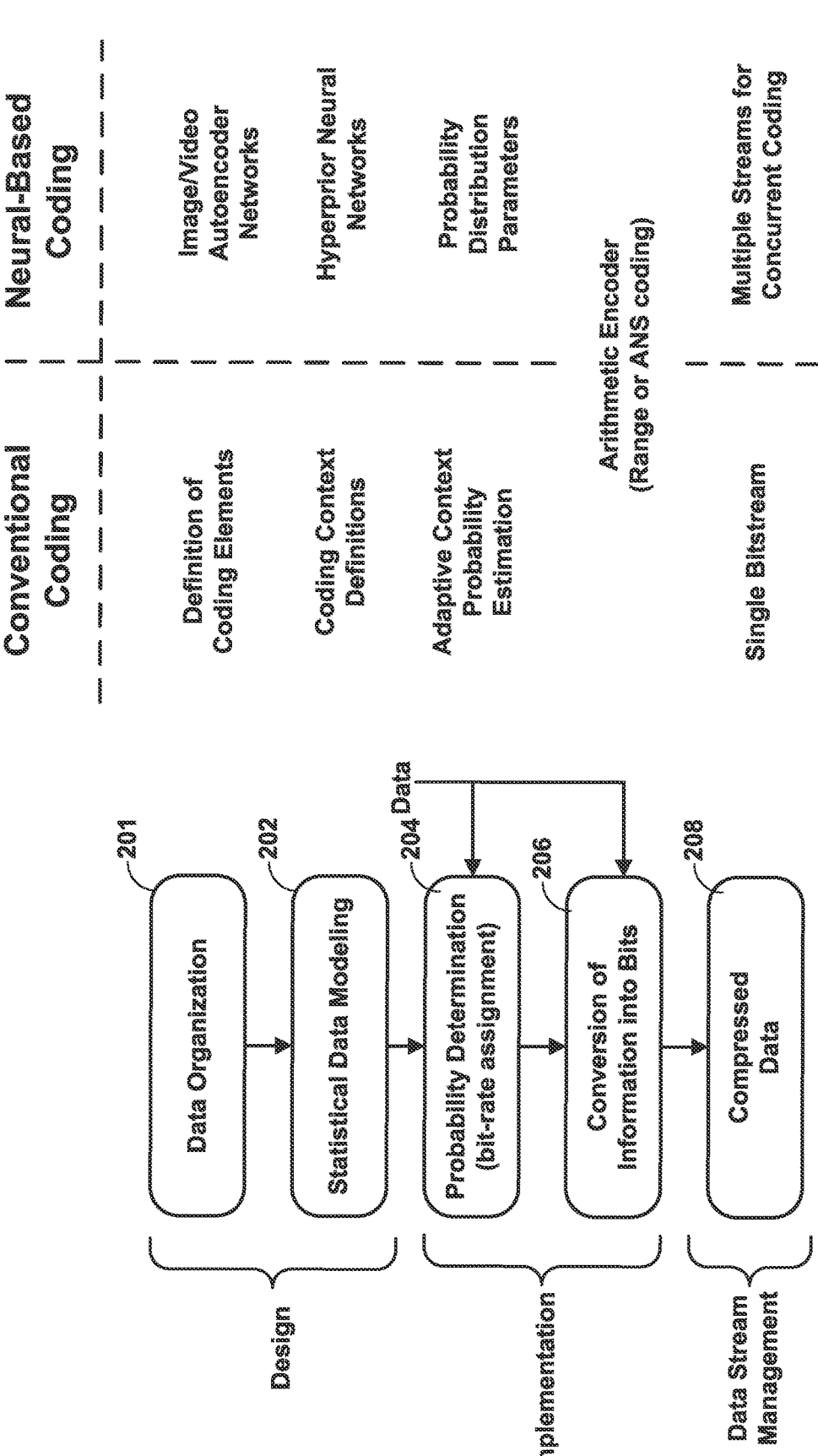
FIG. 2 illustrates differences being conventional media coding and neural-based media coding.

As shown in FIG. 2, the design phase of both conventional and neural-based coding techniques include data organization process 201 and statistical data modeling process 202. For conventional media coding techniques, such as H.265, data organization process 201 includes the definition of coding elements (e.g., syntax elements and coding modes). For neural-based coding processes, data organization process 201 includes the training and development of image/video (e.g., media) autoencoder networks. For statistical data modeling process 202, conventional coding techniques include the coding of context definitions, e.g., for an entropy coding process, such as context-adaptive binary arithmetic coding. For neural-based coding processes, statistical data modeling process 202 includes the development and training of a hyperprior neural network.

Both conventional and neural-based coding techniques include an implementation phase that includes probability determination process 204 and conversion of information into bits process 206. Both the probability determination process 204 and conversion of information into bits process 206 are based on the data to be coded. For conventional coding, probability determination process 204 (e.g., a bit-rate assignment process) includes adaptive context probability estimation. For neural-based coding, probability determination process 204 includes the determination of probability distribution parameters, as will be described in more detail below. Both the conventional and neural-based coding techniques use an arithmetic and/or entropy coder (e.g., or arithmetic or entropy encoder or decoder) for the conversion of information into bits process 206. The arithmetic coder may be a Huffman, range or asymmetric numeral system (ANS) coding.

The data stream management phase is the management of compressed data 208. In some example conventional coding systems, the compressed data is in a single bitstream. Some example neural-based coding systems use multiple streams for concurrent coding.

A main entropy coding principle, derived from basic information theory principles, is that the optimal number of bits $N_b$ to be assigned for coding a data symbol is:

$$N_b = -\log_2(\hat{p}), \qquad (1)$$

where $\hat{p}$ is the estimated probability of the value of the symbol to be encoded, with knowledge of $\hat{p}$ shared by the encoder and decoder (e.g., media encoder 200 and media decoder 400). This optimal number for the average number of bits is a fractional number, but it can be effectively achieved in practice using arithmetic coding.

Symbol probabilities can vary widely and frequently, depending on the specific parts of the media content. Thus, in conventional media compression, one of the most important tasks is the efficient estimation of those data symbol probabilities, and how to accurately update the data symbol probabilities as they change during coding. Since this probability estimation is done sequentially, it can be difficult to parallelize entropy coding on conventional video coding processes.

Compression processes proposed for neural-based codecs are designed to work with the assumption that the data to be compressed has a certain type of probability density function (PDF) and only the parameters defining this function can vary. As one example, the PDF can be chosen to have all variables with independent zero-mean Gaussian distributions, each with a different standard deviation $\sigma$. This may not simply be an empiric assumption since the networks "learn" to make it real. The PDF is typically, but not always, Gaussian.

In general, the standard deviation parameter $\sigma$ is a scaling factor for a "template" distribution. For example, the Gaussian or Laplace with zero mean and unit variance are templates, and there are scaling parameters to "stretch" or "shrink" the template. Commonly the standard deviation is used because of its convenience, but it could be any factor.

One important class of processes proposed for neural-based image and video compression adapts the variational autoencoder architecture, where the latent variables are quantized and entropy coded using fixed learned distributions. In some examples, this architecture has been extended by adding a smaller neural network, called hyperprior, that uses the variables generated from the autoencoder to define the probability distributions to be used for entropy coding those autoencoder variables. This hyperprior network also uses quantization and entropy coding, but with pre-defined (e.g., learned) PDF parameters.

This disclosure describes sliding-window rate-distortion optimization techniques that address the problems introduced above. The techniques of this disclosure may enable E2E-NVCs, such as media encoder 200 and media decoder 400, to use sequences of P-frames that are comparable in length to the sequences used by conventional video coders without distortion increasing as the E2E-NVC proceeds through the sequence of P-frames.

Figure 3:
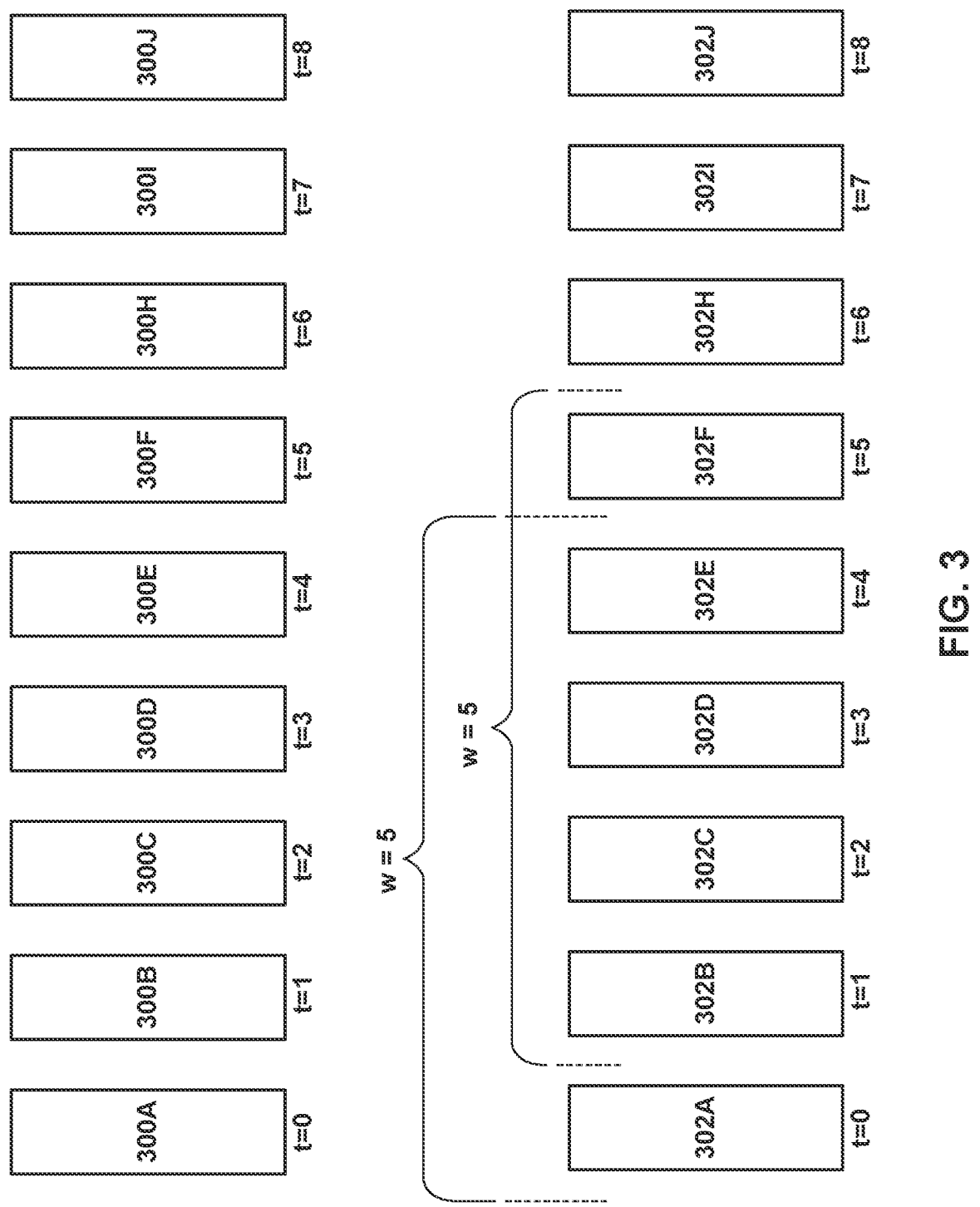
FIG. 3 shows an example of a set of input frames coded with an image analysis neural network to generate a set of output frames.

FIG. 3 shows an example of a set of input frames 300A-300J, which cover a time sequence from time t=0 to t=8. Media encoder 200 sequentially encodes input frames 300A-300J, with an image analysis neural network, to produce output frames 302A-302J. Thus, output frame 302A corresponds to an encoded version of input frame 300A; output frame 302B corresponds to an encoded version of input frame 300B, and so on. Output frames 302A-302J may, for example, be down sampled versions of input frames 300A-300J. Output frames 302A-302J may be part of a larger group of pictures (GOP) that begins with an I-frame. Output frames 302A-302J may, for example, all be P frames that follow the initial I-frame in the GOP. In other examples, output frame 302A may be an I-frame, while frames 302B to 302J may be P or B frames.

Media encoder 200 may optimize output frames 302A-302J using a sliding window. That is, media encoder 200 may modify sample values of any or all of output frames 302A-302J in order to improve the overall coding quality across all frames. To modify the sample value, media encoder 200 may, for example, modify either a predictor or a residual value for the sample or may modify a singular value indicative of the sample value. For example, using a window size of w=5, media encoder 200 may determine a modification to output frame 302A that results in an optimized amount of distortion between output frames 302A-302E and input frames 300A-300E. Media encoder 200 may then determine a modification to output frame 302B that results in an optimized amount of distortion between output frames 302B-302F and input frames 300B-300F. Thus, in the example of FIG. 3, each output frame is modified based on the temporally succeeding next four frames. That is, as shown in FIG. 3, frames 302A-302J are arranged in temporal coding order, which may be the same as display order or may differ from display order. That is, frame 302A is coded before frame 302B, frame 302B is coded before frame 302C, and so on. In this manner, frame 302A may act as a reference frame for frames 302B-302J, frame 302B may act as a reference frame for frames 302C-302J, and so on. Other window sizes, both smaller and larger, may be used instead of five.

As described above, each of output frames 302A-302J are P-frames and are thus decoded based on predictions that rely on previous frames. For example, frame 302J may be predicted based on frame 302I, which is predicted based on frame 302H, which in turn is predicted based on frame 302F, and so on. When modifying output frame 302A, media encoder 200 may, for example, modify output frame 302A in a manner that reduces the total distortion between output frames 302B-302E and input frames 300B-300E, even if such modification increases the total distortion between output frame 302A and input frame 300A. For example, media encoder 200 may modify output frame 302A in a manner that improves the performance of output frame 302A as a reference frame for one or more of frames 302B-302J. Such modifications may be to prediction information, residual information, or both, to create reference samples for one or more of frames 302B-302J. Media encoder 200 may, in fact, prioritize minimizing distortion between the frames that are temporally later in the window, such as input frame 300E and output frame 302E at time t=4, compared to the frames that are temporally earlier in the window, such as input frame 300B and output frame 302B at time t=1.

Media encoder 200 may modify an output frame in a manner that increases the distortion between that output frame and its corresponding input frame, but by doing so, media encoder 200 may make the output frame a better predictor (i.e., reference frame) for future frames. Thus, by modifying a current frame based on a sliding window of future frames in this manner, media encoder 200 may reduce the overall distortion between input frames 300A-300J and output frames 302A-302J, but more significantly, by modifying a current frame based on a sliding window of future frames in this manner, media encoder 200 may achieve a more constant rate of distortion, instead of a varying rate of distortion, across all of output frames 302A-302J and input frames 300A-300J.

A more detailed description of sliding-window rate-distortion optimization will now be described. To perform "end-to-end" neural video coding, media encoder 200 and media decoder 300 attempt to learn a sequential generative model that minimizes the rate-distortion trade-off over any group-of-pictures (GOP), as expressed in equation 2 below.

$$\mathcal{L} = \frac{1}{N}\sum_{i=1}^{N}[R(\hat{y}_i) + \lambda D(x_i, \hat{x}_i)]. \tag{2}$$

In equation (2), R represents the rate estimate for $\hat{y}$ i, which represents an entropy coded representation of the frame $x_i$, with i representing a timestamp of the frame and N representing the GOP size. A rate estimate generally represents an estimate of a number of bits needed to encode the GOP. In equation (2), D represents a measure of distortion between the original frame ($x_i$) and its reconstruction ($\hat{x}_i$). Thus, $\hat{x}_i$ is the frame that results from encoding $x_i$ and then decoding the encoded version of $x_i$. As the encoding and decoding process is not lossless, $\hat{x}_i$ will not perfectly match $x_i$. The amount of difference between the original frame ($x_i$) and the decoded frame ($\hat{x}i$) is referred to as distortion and can generally be measured as a function of peak signal-to-noise ratio, a mean squared error, or other such techniques.

In equation (2), λ represents a Lagrange multiplier to control the rate-distortion trade-off. Rate and distortion are typically inversely proportional, such that increasing rate decreases distortion and decreasing rate increases distortion. The value of λ controls this tradeoff.

Media encoder 200 and media decoder 300 may be configured to perform intra-coding, which begins by coding a still image using an image codec. This initializes the GOP and creates an I-frame. Media encoder 200 and media decoder 300 may also perform inter-coding, in which, using one or more previously reconstructed, i.e., decoded, frames, media encoder 200 and media decoder 300 code the current frame. Inter-coding exploits temporal redundancies not present in intra-coding and creates P-frames. Inter-coding may also include bi-directional inter-prediction, in which a current frame is predicted from two other frames, such as a frame that precedes the current frame in display order and a frame that follows the current frame in display order, thereby creating a B-frame. GOPs of this disclosure may include I frames followed by P- and/or B-frames.

As introduced above, when operating with traditional video codecs, GOPs are often large, with few (if any) I-frames. In such a case, codecs must solve for the challenging balance of bit allocation and quality propagation across long sequences. This is achieved via complex decisions made by hand-designed encoders, such as H.266. Large GOPs are especially preferable as P-frames can typically be coded with significantly fewer bits, which results in smaller file sizes. E2E-NVCs, however, typically perform best with much smaller GOPs, hurting performance on a relative basis. In such a case that an E2E-NVC uses a large or "infinite" GOP (a video sequence with only one I-frame), typical measures of video quality, such as peak-signal-to-noise ratio (PSNR), will rapidly degrade, causing it to become imperative to regularly insert I-frames to maintain stable video quality. In summary, E2E-NVCs, unlike e.g. H.266, perform poorly in balancing bit allocation across long sequences of P-frames.

To understand the likely cause, it is important to consider how E2E-NVCs are trained. That is, when working with E2E-NVCs it is not possible to train with the large GOP sizes that may be desirable for use in practical applications. For among other reasons, training with longer sequences often utilizes an impractical amount of memory and is time-intensive. As an illustration of this, H.266 would generally consider 32 frames to be a small GOP, whereas the maximum length of the popular E2E-NVC training data set Vimeo90k is only 7 frames. As such, practitioners currently hope that the E2E-NVC is capable of inferring the hand-designed rules for bit allocation over long sequences native to traditional video codecs when trained only on small sequences, but this is generally not achieved.

To circumvent this challenge, this disclosure introduces an encoding step in E2E-NVCs that may mimic the bit allocation decisions of traditional codecs. More specifically, this disclosure describes techniques for configuring media encoder 200, using a sliding window, to perform gradient steps on each $\hat{y}_i$ and its quantization step-size prior to entropy coding and quantization. The techniques of this disclosure further include configuring media encoder 200 to perform gradient steps on the derivative of a modified rate-distortion objective (Equation (4) below) designed to promote video quality propagation for frames outside of the current window.

The techniques described herein may include configuring media encoder 200 to send a trivial number of additional bits per frame, but may result in an excess of a 20% Bjontegaard-Delta rate improvement over existing approaches. The additional bits may, for example, include a scalar value that can be used to scale and re-scale the latent variable presentation. This may, for instance, be a 16-bit float floating value. These additional bits, however, are not essential to the other techniques described herein. The techniques of this disclosure may additionally enable the use of an "infinite" GOP setting, which is currently not possible without the sliding window and the consideration of the modified rate-distortion objective.

In the following description, the entropy coded representation of the frame $x_i$ is represented as $\hat{y}_i$, such that:

$$\hat{y}_i = \left\lfloor \frac{y_i - \mu_i}{\delta_i} \right\rceil,$$

where $\delta i$ is a scalar quantization step size, e.g., a rounding bin size to control precision. The value of pi is a prediction of yi and $[\cdot]$ is a rounding function. The scalar quantization step size represents an amount of quantization, and hence an amount of compression, applied to the difference between the frame and the prediction of the frame. For a window of length w, media encoder 200 may be configured to minimize the following term:

$$\underset{y_1, \delta_1}{\text{minimize}} \left\{ \frac{1}{w} \sum_{j=1}^{w} \left[ R\left( \left\lfloor \frac{y_j - \mu_j}{\delta_j} \right\rceil \right) + g(j) D(x_j, \hat{x}_j) \right] \right\},$$

using gradient descent updates of $y_j$ and $\delta_j$ in the current frame only (i.e., j=1, such that global i refers to local position j). That is, media encoder 200 may calculate the gradient of the loss function with respect to $y_j$ and $\delta_j$. Media encoder 200 may then update those quantities using the calculated gradients in the direction of a minimal loss value. Gradient descent represents the optimization strategy used to train neural networks. In this example, j refers to the position within a window and i refers to the position over the entire sequence. Further, it should be noted that the term above uses the function g(j) instead of $\lambda$, as in equation 2. The function g(j) represents a monotonic step function of the intra-window frame that increases the importance of distortion for later frames in the sequence. That is, as described above, g(j) may achieve the purpose of prioritizing the minimization of the distortion between the frames that are temporally later in the window compared to the frames that are temporally earlier in the window. This function enables the approach to work when considering only a small window of data at any one time.

Given an I-frame and w, the overall encoding algorithm for a sequence of length L can be represented by Algorithm 1 below.

---

Algorithm 1:

---

```
procedure Compress(x2:L)
    for i = 2; i ≤ L; i = i + 1 do
        Minimize yi and δi subject to Eq. (3) for xi:i+w
        Entropy code y^i and δi
    end for
    return x^2:L
end procedure
```

---

As mentioned, the ability to adaptively allocate bits on-the-fly allows the described process to not need I-frames subsequent to the first I-frame, thus achieving an "infinite" GOP. This results in a lower bit-rate with minimal quality degradation and a 20% Bjontegaard-Delta rate improvement over processes evaluated on a smaller GOP.

Figure 4:
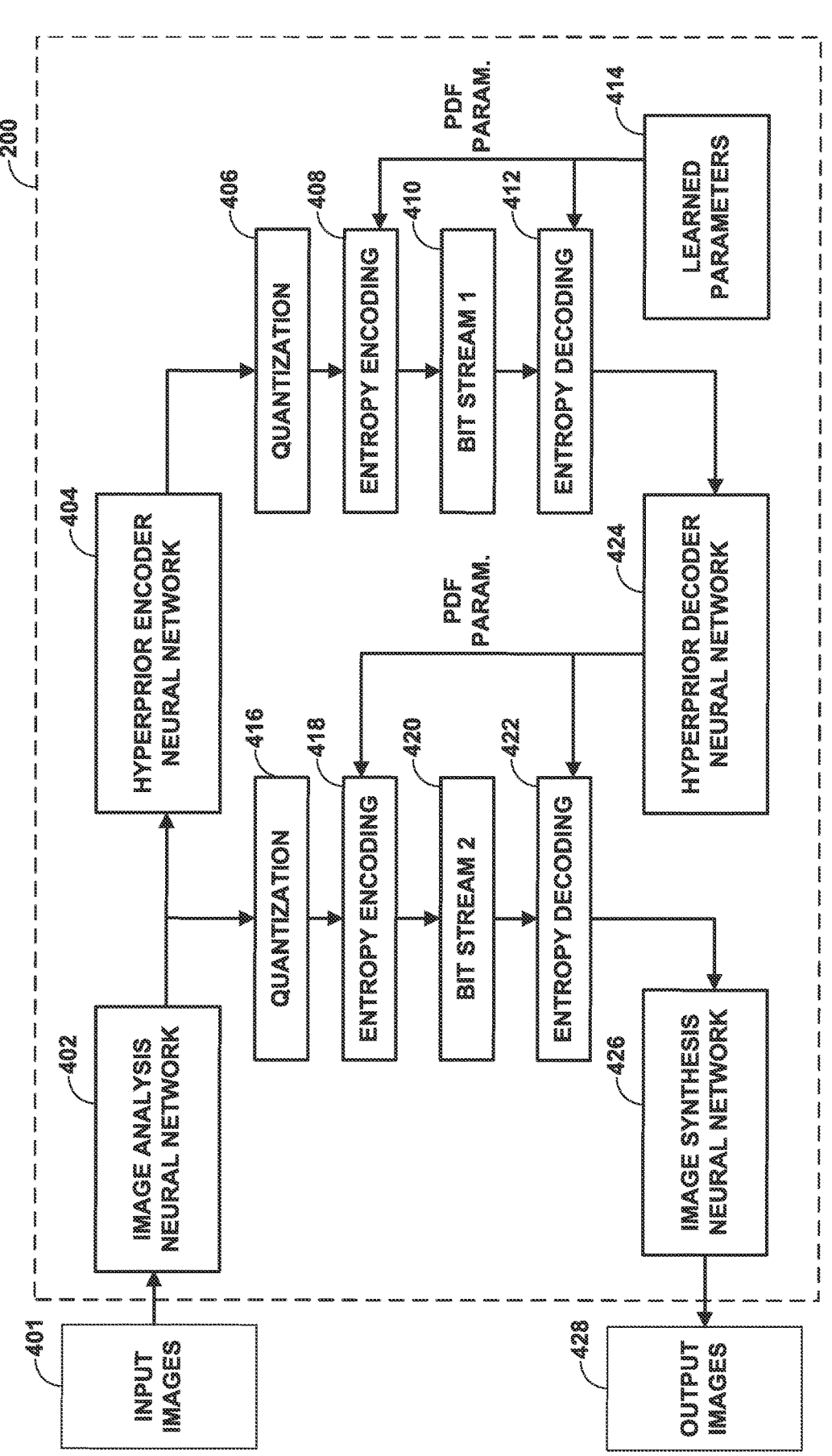
FIG. 4 is a block diagram illustrating an example neural-based image codec.

FIG. 4 is a diagram of a neural image codec that may utilize the sliding-window rate-distortion optimization techniques of this disclosure. The process shown in FIG. 4, where the neural networks for image analysis and synthesis implement the variational autoencoder, and entropy coding of its variables is defined by the hyperprior decoder network (used at both sender and receiver). Since encoder and decoder (e.g., media encoder 200 and media decoder 400) have been used to denote autoencoder parts, in the neural network literature it is common to refer to the systems traditionally called by those names as sender and receiver, respectively.

In FIG. 4, media encoder 200 may include image analysis neural network 402, hyperprior encoder neural network 404, quantization process 406, entropy encoding process 408, quantization process 416, and entropy encoding process 418. Media encoder 200 may also include entropy decoding process 412, hyperprior decoder neural network 424, entropy decoding process 422, and image synthesis neural network 426 (which may be similar to a reconstruction loop in a hybrid video coder). Though not shown, media decoder 400 may include similar structures to entropy decoding process 412, hyperprior decoder neural network 424, entropy decoding process 422, and image synthesis neural network 426.

Image analysis neural network 402 is a neural network configured to encode and/or compress input images 401. In accordance with the techniques of this disclosure, image analysis neural network 402 encodes a set of input frames to generate a corresponding set of output frames. Quantization unit 416 then quantizes the set of output frames. In accordance with the techniques of this disclosure, media encoder 200 may determine a modification to an output frame that results in an optimized amount of distortion between the set of input frames and decoded versions of the corresponding set of output frames. The modification may be either a change to a sample value of the output frame or a change to the amount of quantization applied by quantization unit 416. Entropy encoding unit 418 may then entropy encode the updated output frame.

The compressed data stream created by image analysis neural network 402 is then processed by hyperprior encoder neural network 404. The output of hyperprior encoder neural network 404 is then quantized by quantization process 406 and entropy coded by entropy encoding process 408 to create bitstream 1 410. Hyperprior encoder neural network 404 is part of the process configured to determine parameters (e.g., a standard deviation) of a PDF for the data stream created by image analysis neural network 402. The parameters of the PDF may then be used to entropy encode the data stream from image analysis neural network 402.

Entropy encoding process 408 itself uses PDF parameters (e.g., learned parameter 414) that are learned from a plurality of images to be encoded. Entropy decoding process 412 uses the same PDF parameters to entropy decode bitstream 1 410. This entropy decoded bitstream is then processed by hyperprior decoder neural network 424 in order to generate the PDF parameters for the specific image (e.g., input image 401) being decoded.

The PDF parameters generated by hyperprior decoder neural network 424 are then used by entropy encoding process 418 to encode the data stream produced by image analysis neural network 402 after quantization by quantization process 416. Entropy encoding process 418 create bitstream 2 420. Bitstream 2 420 is then entropy decoded by entropy decoding process 422 using the same PDF parameters from hyperprior decoder neural network 424. After entropy decoding, image synthesis neural network 426 processes the decoded data to produce output images 428.

FIG. 5 is a flowchart illustrating an example process for encoding a set of input frames. current block in accordance with the techniques of this disclosure. Although described with respect to media encoder 200 (FIGS. 1 and 4), it should be understood that other devices may be configured to perform a process similar to that of FIG. 5.

In this example, media encoder 200 encodes a set of input frames of the video data with an image analysis neural network to generate a corresponding set of output frames (500). The set of output frames includes a first output frame and additional output frames, and the first output frame temporally precedes the additional output frames. The first output frame may, for example, be an inter-predicted frame, and the additional output frames may also all be inter-predicted frames. The first output frame and the additional output frames may belong to a group of pictures that includes only one intra-coded frame, and the first output frame and the additional output frames may all follow the one intra-coded frame. The set of output frames may also include a second output frame that temporally follows the first output frame, and media encoder 200 may predict the second output frame based on the first output frame. In some examples, the set of output frames may, for example, consist of five or six total output frames, although more or fewer output frames may also be used. The set of output frames may, for example, include down sampled versions of the set of input frames.

Media encoder 200 determines a modification to the first output frame that results in an optimized amount of distortion between the set of input frames and decoded versions of the corresponding set of output frames (502). To determine the modification to the first output frame that results in the optimized amount of distortion between the set of input frames and decoded versions of the corresponding set of output frames, media encoder 200 may determine a modified scalar quantization step size for the first output frame.

To determine the modification to the first output frame that results in the optimized amount of distortion between the set of input frames and decoded versions of the corresponding set of output frames, media encoder 200 may, for example, be configured to determine for a first decoded version of a first output frame of the set of output frames and a corresponding first input frame, a first amount of distortion; determine for a second decoded version of a second output frame of the set of output frames and a corresponding second input frame, a second amount of distortion; determine a first weighting factor for the first amount of distortion based on a temporal position of the first decoded version of the first output frame; determine a second weighting factor for the second amount of distortion based on a temporal position of the second decoded version of the second output frame, wherein the first weighting factor is different than the second weighting factor; and determine the optimized amount of distortion based on the first weighting factor and the second weighting factor. In this example, the second output frame may temporally follow the first output frame, and the second weighting factor may be greater than the first weighting factor.

Media encoder 200 updates the first output frame based on the determined modification (504). Media encoder 200 may, for example, update the first output frame by changing a sample value of at least one sample of the first output frame. In some instances, updating the first output frame may increase an amount of distortion between the first output frame and a decoded version of the corresponding input frame in order to reduce the distortion between decoded versions of later output frames and corresponding input frames. In some examples, media encoder 200 update the first output frame by changing a scalar quantization step size for the first output frame to the modified scalar quantization step size.

Media encoder 200 outputs a bitstream that includes the updated first output frame (506). Media encoder 200 may, for example, output the bitstream for storage or transmission.

The following numbered clauses illustrate one or more aspects of the devices and techniques described in this disclosure.

Clause 1: A method of encoding video data, the method comprising: encoding a set of input frames of the video data with an image analysis neural network to generate a corresponding set of output frames, wherein the set of output frames includes a first output frame and additional output frames, wherein the first output frame temporally precedes the additional output frames; determining a modification to the first output frame that results in an optimized amount of distortion between the set of input frames and decoded versions of the corresponding set of output frames; updating the first output frame based on the determined modification; and outputting a bitstream that includes the updated first output frame.

Clause 2: The method of clause 1, wherein the set of output frames comprises down sampled versions of the set of input frames.

Clause 3: The method of clause 1 or 2, wherein updating the first output frame comprises changing a sample value of at least one sample of the first output frame.

Clause 4: The method of any of clauses 1-3, wherein updating the first output frame increases an amount of distortion between the first output frame and a decoded version of the corresponding input frame.

Clause 5: The method of any of clauses 1-4, wherein the set of output frames includes a second output frame that temporally follows the first output frame, wherein encoding the set of input frames of the video data with the image analysis neural network to generate the corresponding set of output frames comprises predicting the second output frame based on a decoded version of the first output frame.

Clause 6: The method of any of clauses 1-5, wherein the first output frame comprises an inter-predicted frame and the additional output frames are all inter-predicted frames.

Clause 7: The method of any of clauses 1-6, wherein the first output frame and the additional output frames belong to a group of pictures that includes only one intra-coded frame and wherein the first output frame and the additional output frames are all inter-predicted frames.

Clause 8: The method of any of clauses 1-7, wherein determining the modification to the first output frame that results in the optimized amount of distortion between the set of input frames and decoded versions of the corresponding set of output frames comprises: determining for a first decoded version of a first output frame of the set of output frames and a corresponding first input frame, a first amount of distortion; determining for a second decoded version of a second output frame of the set of output frames and a corresponding second input frame, a second amount of distortion; determining a first weighting factor for the first amount of distortion based on a temporal position of the first decoded version of the first output frame; determining a second weighting factor for the second amount of distortion based on a temporal position of the second decoded version of the second output frame, wherein the first weighting factor is different than the second weighting factor; determining the optimized amount of distortion based on the first weighting factor and the second weighting factor.

Clause 9: The method of clause 8, wherein the second output frame temporally follows the first output frame, and the second weighting factor is greater than the first weighting factor.

Clause 10: The method of any of clauses 1-9, wherein the set of output frames consists of the first output frame and four additional output frames.

Clause 11: The method of any of clauses 1-9, wherein the set of output frames consists of the first output frame and five additional output frames.

Clause 12: The method of any of clauses 1-11, wherein determining the modification to the first output frame that results in the optimized amount of distortion between the set of input frames and decoded versions of the corresponding set of output frames comprises determining a modified scalar quantization step size for the first output frame.

Clause 13: A device for encoding video data, the device comprising: a memory configured to store video data; one or more processors implemented in circuitry and configured to: encode a set of input frames of the video data with an image analysis neural network to generate a corresponding set of output frames, wherein the set of output frames includes a first output frame and additional output frames, wherein the first output frame temporally precedes the additional output frames; determine a modification to the first output frame that results in an optimized amount of distortion between the set of input frames and decoded versions of the corresponding set of output frames; update the first output frame based on the determined modification; and output a bitstream that includes the updated first output frame.

Clause 14: The device of clause 13, wherein the set of output frames comprises down sampled versions of the set of input frames.

Clause 15: The device of any of clauses 13-14, wherein to update the first output frame, the one or more processors are further configured to change a sample value of at least one sample of the first output frame.

Clause 16: The device of any of clauses 13-15, wherein updating the first output frame increases an amount of distortion between the first output frame and a decoded version of the corresponding input frame.

Clause 17: The device of any of clauses 13-16, wherein the set of output frames includes a second output frame that temporally follows the first output frame, wherein to encode the set of input frames of the video data with the image analysis neural network to generate the corresponding set of output frames, the one or more processors are further configured to predict the second output frame based on a decoded version of the first output frames.

Clause 18: The device of any of clauses 13-17, wherein the first output frame comprises an inter-predicted frame and the additional output frames are all inter-predicted frames.

Clause 19: The device of any of clauses 13-18, wherein the first output frame and the additional output frames belong to a group of pictures that includes only one intra-coded frame and wherein the first output frame and the additional output frames are all inter-predicted frames.

Clause 21: The device of any of clauses 13-19, wherein to determine the modification to the first output frame that results in the optimized amount of distortion between the set of input frames and decoded versions of the corresponding set of output frames, the one or more processors are further configured to: determine for a first decoded version of a first output frame of the set of output frames and a corresponding first input frame, a first amount of distortion; determine for a second decoded version of a second output frame of the set of output frames and a corresponding second input frame, a second amount of distortion; determine a first weighting factor for the first amount of distortion based on a temporal position of the first decoded version of the first output frame; determine a second weighting factor for the second amount of distortion based on a temporal position of the second decoded version of the second output frame, wherein the first weighting factor is different than the second weighting factor; determine the optimized amount of distortion based on the first weighting factor and the second weighting factor.

Clause 22: The device of clause 21, wherein the second output frame temporally follows the first output frame, and the second weighting factor is greater than the first weighting factor.

Clause 23: The device of any of clauses 13-22, wherein the set of output frames consists of the first output frame and four additional output frames.

Clause 24: The device of any of clauses 13-22, wherein the set of output frames consists of the first output frame and five additional output frames.

Clause 25: The device of any of clauses 13-24, wherein to determine the modification to the first output frame that results in the optimized amount of distortion between the set of input frames and decoded versions of the corresponding set of output frames, the one or more processors are further configured to determine a modified scalar quantization step size for the first output frame.

Clause 26: The device of any of clauses 13-25, wherein the device comprises one or more of a camera, a computer, or a mobile device.

Clause 27: The device of any of clauses 13-26, further comprising: a camera configured to capture the video data.

Clause 28: A computer-readable storage medium storing instructions that when executed by one or more processors cause the one or more processors to: encode a set of input frames of the video data with an image analysis neural network to generate a corresponding set of output frames, wherein the set of output frames includes a first output frame and additional output frames, wherein the first output frame temporally precedes the additional output frames; determine a modification to the first output frame that results in an optimized amount of distortion between the set of input frames and decoded versions of the corresponding set of output frames; update the first output frame based on the determined modification; and output a bitstream that includes the updated first output frame.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising: encoding a set of input frames of the video data with an image analysis neural network to generate a corresponding set of output frames, wherein the set of output frames has an initial amount of distortion relative to the set of input frames;

determining, for each respective output frame of the set of output frames, a modification that results in a modified amount of total distortion between a sliding window of decoded versions of output frames and a corresponding set of input frames, wherein the respective output frame temporally precedes other output frames in the sliding window;

updating each respective output frame based on the determined modifications, wherein the modified amount of distortion is less than the initial amount of distortion, and wherein for at least one output frame, updating the at least one output frame increases an amount of distortion between the at least one output frame and a decoded version of the corresponding input frame; and outputting a bitstream that includes the updated output frames.

2. The method of claim 1, wherein the set of output frames comprises down sampled versions of the set of input frames.

3. The method of claim 1, wherein updating each respective output frame comprises changing a sample value of at least one sample of each respective output frame.

4. The method of claim 1, wherein determining the modification that results in the modified amount of total distortion between the set of input frames and decoded versions of the corresponding set of output frames comprises:

determining for a first decoded version of a first output frame of the set of output frames and a corresponding first input frame, a first amount of distortion;

determining for a second decoded version of a second output frame of the set of output frames and a corresponding second input frame, a second amount of distortion;

determining a first weighting factor for the first amount of distortion based on a temporal position of the first decoded version of the first output frame;

determining a second weighting factor for the second amount of distortion based on a temporal position of the second decoded version of the second output frame, wherein the first weighting factor is different than the second weighting factor;

determining the modified amount of total distortion based on the first weighting factor and the second weighting factor.

5. The method of claim 4, wherein the second output frame temporally follows the first output frame, and the second weighting factor is greater than the first weighting factor.

6. The method of claim 1, wherein the sliding window consists of the respective output frame and four additional output frames.

7. The method of claim 1, wherein the sliding window consists of the respective output frame and five additional output frames.

8. The method of claim 1, wherein determining the modification that results in the modified amount of total distortion between the set of input frames and decoded versions of the corresponding set of output frames comprises determining a modified scalar quantization step size for each respective output frame.

9. The method of claim 1, wherein the set of output frames includes a first output frame and a second output frame that temporally follows the first output frame, wherein encoding the set of input frames of the video data with the image analysis neural network to generate the corresponding set of output frames comprises predicting the second output frame based on a decoded version of the first output frame.

10. The method of claim 9, wherein the first output frame comprises an inter-predicted frame and the second output frames are all inter-predicted frames.

11. The method of claim 9, wherein the first output frame and the second output frame belong to a group of pictures that includes only one intra-coded frame and wherein the first output frame and the second output frame are inter-predicted frames.

12. A device for encoding video data, the device comprising: a memory configured to store the video data; one or more processors implemented in circuitry and configured to:

encode a set of input frames of the video data with an image analysis neural network to generate a corresponding set of output frames, wherein the set of output frames has an initial amount of distortion relative to the set of input frames;

determine, for each respective output frame of the set of output frames, a modification that results in a modified amount of total distortion between a sliding window of decoded versions of output frames and a corresponding set of input frames, wherein the respective output frame temporally precedes other output frames in the sliding window;

update each respective output frame based on the determined modifications, wherein the modified amount of distortion is less than the initial amount of distortion, and wherein for at least one output frame, the update increases an amount of distortion between the at least one output frame and a decoded version of the corresponding input frame; and output a bitstream that includes the updated output frames.

13. The device of claim 12, wherein the set of output frames comprises down sampled versions of the set of input frames.

14. The device of claim 12, wherein to update each respective output frame, the one or more processors are further configured to change a sample value of at least one sample of each respective output frame.

15. The device of claim 12, wherein the set of output frames includes a first output frame and a second output frame that temporally follows the first output frame, wherein to encode the set of input frames of the video data with the image analysis neural network to generate the corresponding set of output frames, the one or more processors are further configured to predict the second output frame based on a decoded version of the first output frames.

16. The device of claim 15, wherein the first output frame comprises an inter-predicted frame and the second output frames are all inter-predicted frames.

17. The device of claim 15, wherein the first output frame and the second output frame belong to a group of pictures that includes only one intra-coded frame and wherein the first output frame and the second output frames are all inter-predicted frames.

18. The device of claim 12, wherein to determine the modification that results in the modified amount of total distortion between the set of input frames and decoded versions of the corresponding set of output frames, the one or more processors are further configured to:

determine for a first decoded version of a first output frame of the set of output frames and a corresponding first input frame, a first amount of distortion;

determine for a second decoded version of a second output frame of the set of output frames and a corresponding second input frame, a second amount of distortion;

determine a first weighting factor for the first amount of distortion based on a temporal position of the first decoded version of the first output frame;

determine a second weighting factor for the second amount of distortion based on a temporal position of the second decoded version of the second output frame, wherein the first weighting factor is different than the second weighting factor;

determine the modified amount of total distortion based on the first weighting factor and the second weighting factor.

19. The device of claim 18, wherein the second output frame temporally follows the first output frame, and the second weighting factor is greater than the first weighting factor.

20. The device of claim 12, wherein the sliding window consists of the respective output frame and four additional output frames.

21. The device of claim 12, wherein the sliding window consists of the respective output frame and five additional output frames.

22. The device of claim 12, wherein to determine the modification that results in the modified amount of total distortion between the set of input frames and decoded versions of the corresponding set of output frames, the one or more processors are further configured to determine a modified scalar quantization step size for each respective output frame.

23. The device of claim 12, wherein the device comprises one or more of a camera, a computer, or a mobile device.

24. The device of claim 12, further comprising:
a camera configured to capture the video data.

25. A non-transitory computer-readable storage medium storing instructions that when executed by one or more processors cause the one or more processors to:

encode a set of input frames of video data with an image analysis neural network to generate a corresponding set of output frames, wherein the set of output frames has an initial amount of distortion relative to the set of input frames;

determine, for each respective output frame of the set of output frames, a modification that results in a modified amount of total distortion between a sliding window of decoded versions of output frames and a corresponding set of input frames, wherein the respective output frame temporally precedes other output frames in the sliding window;

update each respective output frame based on the determined modifications, wherein the modified amount of distortion is less than the initial amount of distortion, and wherein for at least one output frame, the update increases an amount of distortion between the at least one output frame and a decoded version of the corresponding input frame; and output a bitstream that includes the updated output frames.

\* \* \* \* \*